July 5, 1932. S. H. PELTIER 1,865,787
DEVICE FOR MAKING VITREOUS LIKE OBJECTS
Filed Aug. 8, 1929 2 Sheets-Sheet 1

Inventor:
Sellers H. Peltier
By: Wallace R. Lane
Atty.

July 5, 1932. S. H. PELTIER 1,865,787
DEVICE FOR MAKING VITREOUS LIKE OBJECTS
Filed Aug. 8, 1929 2 Sheets-Sheet 2
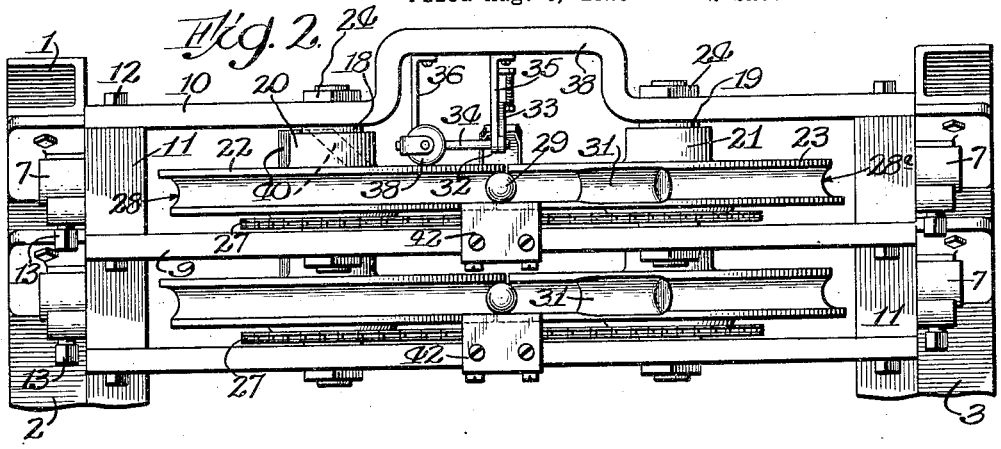
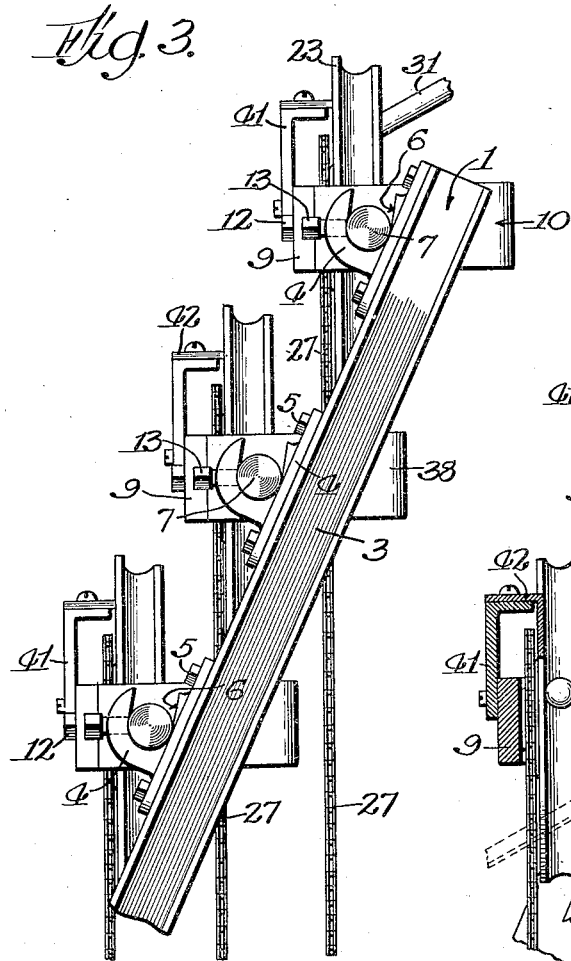
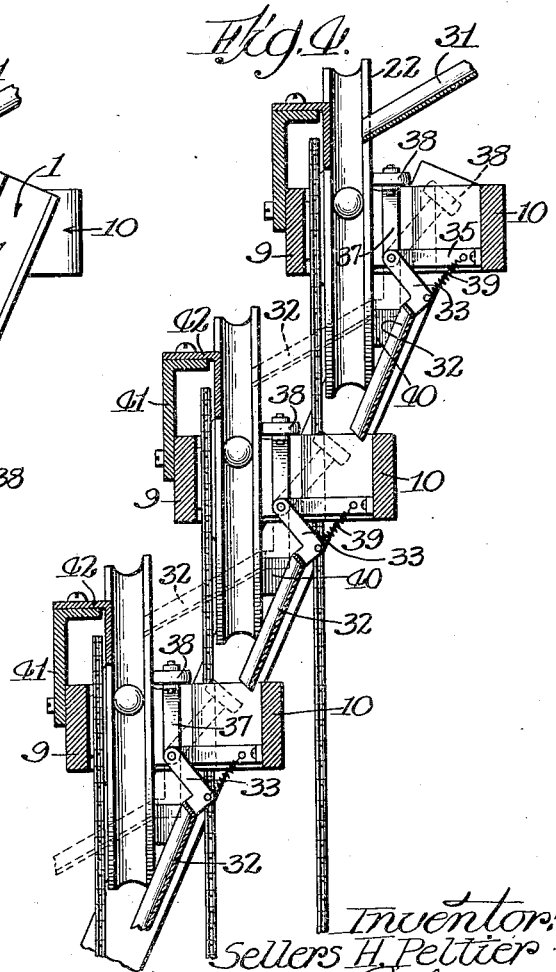
Inventor:
Sellers H. Peltier
By Wallace R. Lane
Atty.

Patented July 5, 1932

1,865,787

UNITED STATES PATENT OFFICE

SELLERS H. PELTIER, OF OTTAWA, ILLINOIS, ASSIGNOR TO THE PELTIER GLASS COMPANY, OF OTTAWA, ILLINOIS, A CORPORATION OF ILLINOIS

DEVICE FOR MAKING VITREOUS LIKE OBJECTS

Application filed August 8, 1929. Serial No. 384,357.

The present invention relates to moulding devices for making vitreous like objects, such as glass marbles and various other like and similar articles.

Among the objects of the invention is to provide a novel device for the shaping, forming or fashioning a plastic body of vitreous-like material such as a gob or mold charge which has been severed from a mass of molten material supplied from a melting tank.

The invention comprehends the idea of providing novel means for receiving this severed gob or mould charge and to pass the same through a series of moulding elements or members whereby the gob or moulding charge is successively worked and fashioned, the gob or mould charge in the form of the finished article or product being discharged therefrom either with or without the annealing step.

Another object of the invention is to provide novel means for the release of this gob or severed mould charge successively from one set of moulding elements or members such that the gob may be successively worked and transferred from set to set.

The invention further comprehends the idea of providing novel means for transferring this partially shaped and fashioned vitreous-like mould charge from one set of moulding elements to another, this novel means normally being adapted to direct or guide under-size gobs or partly fashioned objects passing through or between a set of moulding elements, to a collecting basin or compartment for re-melting, but likewise adapted to be automatically positioned at the time of release of the mould charge for directing the same to the next successive set of moulding elements. Like means are provided or associated with each set of moulding members or elements for transferring a like body of partially worked or shaped vitreous like material to the next successive set of moulding members.

Another object of the invention is to provide novel means for adjusting the relation of the surfaces of the moulding elements or members within each set, as likewise to adjust the relation of the various sets of moulding elements or members.

The invention comprehends as another of its objects, the provision of a novel moulding element or member preferably designed to have a release means in its cycle of operation, which means in a specific embodiment of the invention, is in the form of a recess in the moulding or fashioning surface, so as to permit a ready transfer of the object from the moulding members.

The novel device and means herein before referred to and as shown in the embodiment selected to illustrate the invention as applicable to the moulding of vitreous-like objects such as marbles or the like, comprises a frame having mounted thereon sets of spaced wheels arranged in series, each wheel having a grooved periphery for the shaping of a spherical body, such as a marble, the shouldered or flanged portion of the groove on one side of the wheel being of greater depth than on the other in order to twist and rotate the mould charge between the wheels and to work and fashion them as the wheels are caused to rotate.

A wheel in each set is provided with a recessed or depressed portion for the release of the vitreous-like object to the next successive set of moulding wheels, such recessed or depressed portion releasing the object to the next successive set automatically.

A wheel of each set of moulding elements is provided with a lug or cam which is adapted to engage a member pivotally connected with a trough or chute to swing the same, at the time of release of the object, into a position for transferring the object to the next successive set of moulding elements, after which the trough returns to its normal position for allowing undersize mould charges to drop through or between the moulding wheels to a collecting compartment, for remelting.

Other objects, advantages, capabilities and features are comprehended by the invention as will later appear and as are inherently possessed thereby.

Referring to the drawings:

Fig. 2 is a fragmentary top plan view of the embodiment.

Fig. 3 is a fragmentary side view in elevation of the embodiment.

Fig. 4 is a vertical cross-sectional view taken in the plane represented by the line 4—4 of Fig. 1.

Figure 1:
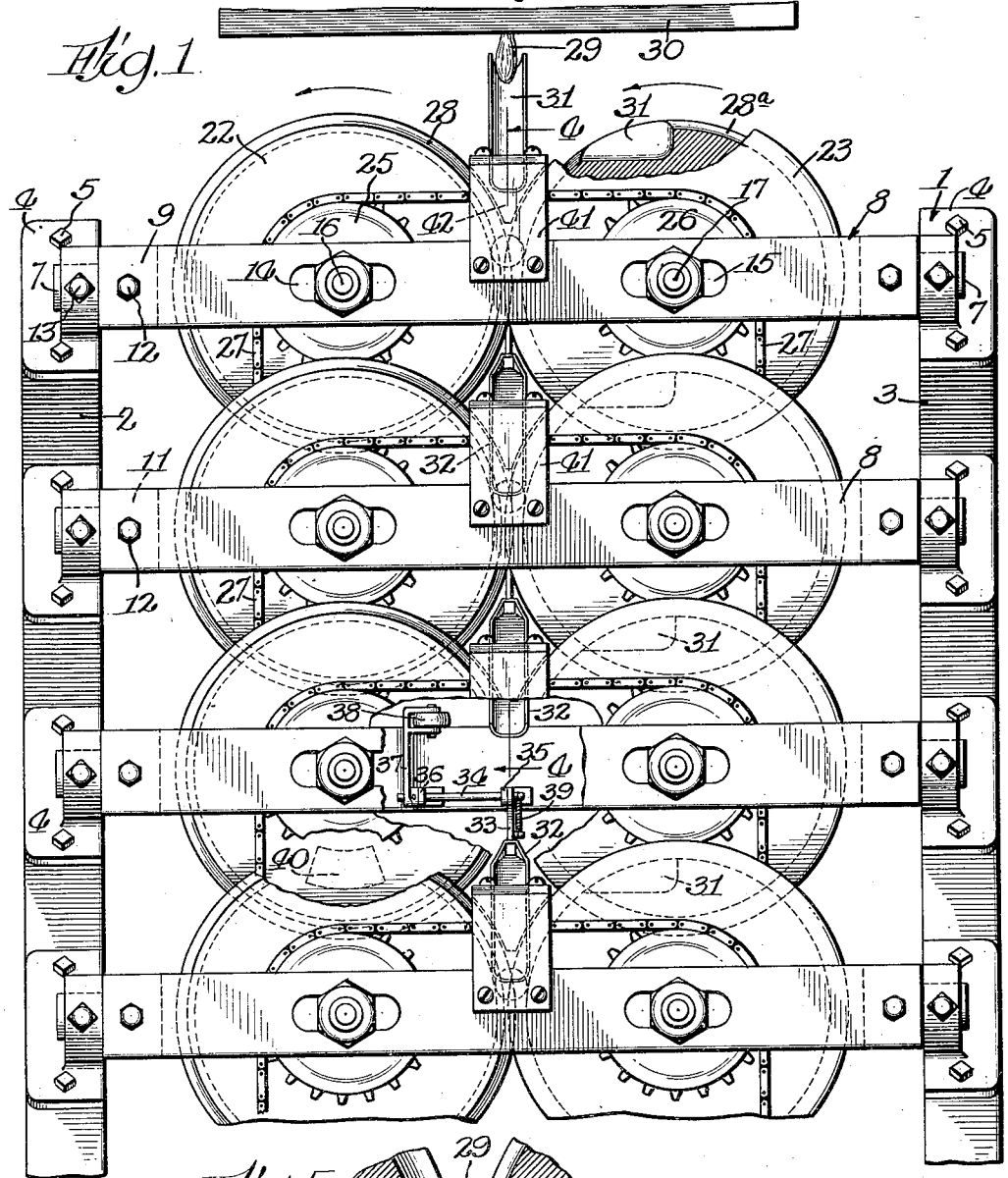
Figure 1 is a fragmentary front view in elevation of a device constructed in accordance with the invention and having parts broken away to show more in detail the construction of the transferring and releasing means.
Figure 5:
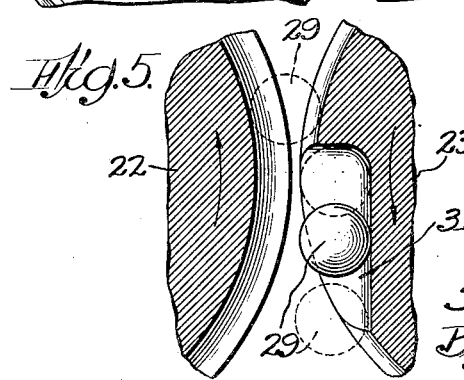
Fig. 5 is an enlarged portion of the wheels shown in the illustrative embodiment and disclosing in detail the construction of the depressed or recessed portion for release of the object in between the moulding elements.

Referring now more in detail to the drawings, the embodiment selected to illustrate the invention is shown as comprising a frame 1 having inclined side members 2 and 3 to which are connected at spaced intervals bracket members 4 by any suitable means such as bolts 5 or the like. These brackets 4 may be provided with a slotted portion 6 adapted to receive the trunnions 7 of cross members or frames 8. The cross members 8 comprise forward and rear members 9 and 10 respectively, these members having spacers 11 at the ends thereof. These spacers preferably have or carry the trunnions 7. The members 9 and 10 are suitably connected to the spacers 11 by bolts 12 or the like.

The frames 8 may be adjustably secured in the brackets 4 by means of a set screw 13 which passes through an internally threaded opening in the portion 6 and contacts the trunnion 7 mounted therein.

The cross members 9 and 10 may be provided with slotted openings 14 and 15 in which are adjustably mounted bolts 16 and 17 passing through bushings or bearing members 18 and 19 fitting in hubs 20 and 21 of the wheels 22 and 23 respectively, the wheels being adapted to be rotated on the bushings when the nuts 24 in threaded engagement with the ends of the bolts, are tightened thereon to position the wheels. Mounted on each of the hubs 20 and 21 are sprockets 25 and 26 over which passes a sprocket chain 27 which in turn passes over like sprockets (not shown) at the base of the device and driven by a suitable source of power.

The wheels 22 and 23 are provided with annular peripheral grooves 28 and 28ª, the annular flange of the groove on one face of a wheel being of a greater depth than the other, the wheels being oppositely mounted so that the flange of greater depth of one of the wheels will be opposite to the flange of less depth of the other wheel, these wheels having sufficient clearance therebetween to permit rotation of the wheels on the bushings 18 and 19 and also to permit rotation of a gob or mould charge 29 in the grooves 28 and 28ª.

This gob or mould charge 29 is severed by any suitable means from a plastic molten mass of vitreous-like material in a melting furnace, as it passes through an orifice means in the bottom 30 of the furnace, and is transferred to the bite or throat of the initial pair or set of wheels 22 and 23 by means of a chute or trough 31 at the uppermost part of the device.

This gob or severed mould charge is caused to rotate in the grooves of the rotating wheels 22 and 23, and because of the unequal depth of the flanges of the groove is twisted and turned and caused to revolve about a plurality of its axes whereby it is worked and fashioned into the desired shape. The wheels rotate in the same angular direction so that the working parts of the grooves fashioning the object, travel in opposite directions.

The periphery of a wheel of each set, such as wheel 23, is provided with a recessed portion or depression 31 so that after the gob or severed charge has been rotated and revolved in the grooves of the rotating wheels 22 and 23 for nearly one revolution thereof, the worked object will move into the recess 31 and be released to drop through and from the wheels.

The object thus fashioned and released, then is transferred to the next successive pair of wheels 22 and 23 by way of a trough or chute 32 having an extended arm 33 mounted on a rod 34 mounted in the eyes of brackets 35 and 36 connected by any suitable means to a bent portion 38 of the rear cross member 10, the other end of the rod being connected to a lever 37 having mounted therein at its upper end, a roller 38 normally adapted to contact the face of the wheel 22. The trough 32 is normally held in a position as shown in full lines of Fig. 4, by means of a spring 39. The chute in this position permits any undersized gob or severed portion of material that may have passed down between the wheels to fall uninterruptedly through the wheels to a collecting compartment or container at the base of the machine where it may be later transferred to the furnace for remelting. When the chute is in the dotted line position, it delivers the object released from the preceding wheel set to the throat of the succeeding set.

At the time that the recessed portion 31 is about to release the object from the throat of wheels 22 and 23, a cam 40 on the wheel 22 engages the roller 38 to throw the same rearwardly and hence, the trough or chute 32 forwardly as shown in dotted lines of Fig. 4, the chute or trough transferring the partially worked and fashioned body or object to the next successive pair of wheels 22 and 23, after which the trough 32 again swings back into its normal position to permit undersize gobs or mould charges or similar object to pass through and between the wheels.

Mounted on the front cross member 9 and oppositely to the trough 32 is an angular member 41 having connected to the top leg thereof another angular member 42 having a downwardly projecting leg acting as a stop or retarder to direct the released gob 29 or partly fashioned object between the wheels 22 and 23 as it is being transferred to the wheels.

In operation, a gob or mould charge of the desired mass is severed by suitable means from the remainder of the molten mass as it passes through the orifice in the bottom of the furnace, the mould charge being severed at given or predetermined intervals of time and directed to the initial pair of wheels just after the partly worked and fashioned charge therebetween, is released therefrom. The severed gob or mould charge is then caused to be worked and revolved upon its axes to fashion and shape the same until such time as the recessed portion releases it from the grooves to be transferred by the chute or trough to the next successive pair of wheels to be further worked and fashioned.

The gob or mould charge thus passes serially from one pair of wheels to another through the machine or device, the mould charge or partly fashioned object being successively worked and finally being released in finished form from the last of the pairs of wheels at the bottom of the device when it may or may not be directed or transferred to an annealer.

While I have herein described and upon the drawings shown an illustrative embodiment of the invention, it is to be understood that it is not limited thereto but may comprehend other constructions, arrangements of parts, details and features without departing from the spirit thereof.

Having thus disclosed the invention, I claim:

1. A device for making vitreous articles comprising a plurality of sets of relatively rotatable molding members, means for rotating said molding members, one member of each set having a peripheral recess for releasing the vitreous object from engagement therewith, and means operating in timed sequence with respect to the release of said object to direct it to the next successive set of molding units.

2. A device for making vitreous articles comprising a plurality of sets of relatively rotatable molding members, means for rotating said molding members, one member of each set having a peripheral recess for releasing the vitreous object from engagement therewith, means operating in timed sequence with the release of said object to direct it toward the next successive set of molding members, and means for deflecting the directed object into engagement with the last mentioned set of molding members.

3. A device for making vitreous objects comprising a series of molding units each consisting of a set of relatively rotatable molding members, means for rotating said molding members, one member of each set having a peripheral recess positioned to periodically release the vitreous object from engagement with the molding members of its set, means for directing the released vitreous object from one set of molding members to the next successive set during rotation thereof, and means for adjusting the molding members of each set with respect to each other, so as to vary the size of the object to be operated upon.

4. A device for molding vitreous objects comprising a plurality of sets of relatively rotatable molding members, means for rotating said molding members, and means operated by one molding member of each set for transferring the vitreous object to the next succeeding set of molding members.

5. A device for moulding a vitreous-like object, comprising sets of wheels arranged in series, a wheel in each set having a recess for release of said object, and means for transferring said object from set to set to successively work and fashion the same.

6. A device for moulding a vitreous-like object, comprising sets of wheels arranged in series, a wheel in each set having a recess for release of said object, means for transferring said object from set to set to successively work and fashion the same, and means for adjusting the wheels.

7. A device for moulding a vitreous-like object, comprising sets of wheels arranged in series, a wheel in each set having a depressed portion for release of said object, and a trough associated with each of said sets for transferring said object successively from set to set as the object is released therefrom.

8. A device for moulding a vitreous-like object, comprising sets of wheels arranged in series, a wheel in each set having a depressed portion for release of said object, a trough associated with each of said sets, and means for moving said troughs to transfer said object successively from set to set as the object is released.

9. A device for moulding a vitreous-like object, comprising sets of wheels arranged in series, a wheel in each set having a depressed portion for release of said object, means pivotally associated with said sets for transferring said object successively from set to set, and means for moving said pivotal means to direct said object successively from set to set.

10. A device for moulding a vitreous-like object, comprising sets of wheels arranged in series, a wheel in each set having a recess for release of said object, means for adjusting said wheels, means pivotally associated with said sets for transferring said released object successively from set to set, and means associated with a wheel of each set for operating said pivotal means to direct said object to the adjacent set.

SELLERS H. PELTIER.